United States Patent
Lætgaard

(10) Patent No.: US 7,370,678 B2
(45) Date of Patent: May 13, 2008

(54) PUMP UNIT FOR VEHICLES

(75) Inventor: Thomas Lætgaard, Horsens (DK)

(73) Assignee: Even Honour International Limited, Tortola (VG)

( * ) Notice: Subject to any disclaimer, the term of this patent is extended or adjusted under 35 U.S.C. 154(b) by 233 days.

(21) Appl. No.: 10/533,532

(22) PCT Filed: Oct. 28, 2003

(86) PCT No.: PCT/DK03/00726

§ 371 (c)(1),
(2), (4) Date: May 13, 2005

(87) PCT Pub. No.: WO2004/039567

PCT Pub. Date: May 13, 2004

(65) Prior Publication Data

US 2005/0274429 A1 Dec. 15, 2005

(30) Foreign Application Priority Data

Oct. 31, 2002 (DK) ............................ 2002 00340 U

(51) Int. Cl.
*B65B 1/04* (2006.01)
(52) U.S. Cl. .................. 141/38; 141/100; 152/415
(58) Field of Classification Search ........... 285/325, 285/326, 194, 7, 921, 124.5; 141/38, 65, 141/67, 100, 114; 152/415; 222/389
See application file for complete search history.

(56) References Cited

U.S. PATENT DOCUMENTS

| 3,812,659 | A | * | 5/1974 | Westergren et al. | ........ 285/325 |
| 4,765,367 | A | * | 8/1988 | Scott | ............................ 141/38 |
| 5,070,917 | A | * | 12/1991 | Ferris et al. | .................... 141/38 |
| 6,283,172 | B1 | * | 9/2001 | Thurner | ........................ 141/38 |
| 6,766,834 | B1 | * | 7/2004 | Eckhardt | ...................... 141/38 |
| 6,789,581 | B2 | * | 9/2004 | Cowan et al. | .............. 141/100 |
| 6,860,515 | B2 | * | 3/2005 | Inoue | .......................... 285/921 |
| 6,964,284 | B2 | * | 11/2005 | Eckhardt | ...................... 141/38 |
| 6,997,352 | B2 | * | 2/2006 | Sallows et al. | ............. 141/114 |

FOREIGN PATENT DOCUMENTS

| DE | 19846451 | 4/2000 |
| DE | 10106468 | 8/2002 |

* cited by examiner

*Primary Examiner*—David Bochna
(74) *Attorney, Agent, or Firm*—James Creighton Wray; Clifford D. Hyra

(57) ABSTRACT

A pump unit for use in pumping and repairing car tires has a box-like jacket (1) in which is provided a socket (10) for fixing a bottle (8) with repair fluid and with a lid/adapter (4) known per se with a large and a small collar (5, 6). By the invention is provided securing of the adapter (4) and thereby of the bottle (8) by providing the socket with two resilient arms (16) that may grip with projections (17) around the large collar (5) behind existing edges (7), thus forming a spring catch for the adapter (4). Hence is provided secure holding of the adapter (4) and ready insertion and removal of the bottle (8) in a simple way.

3 Claims, 1 Drawing Sheet

PUMP UNIT FOR VEHICLES

This application claims the benefit of Danish Application No. BA 2002 00340 filed Oct. 31, 2004 and PCT/DK2003/000726 filed Oct. 28, 2003, which are hereby incorporated by reference in their entirety.

BACKGROUND OF THE INVENTION

The present invention concerns a pump unit for vehicles designed with a side edge along which there is provided a socket for holding in position a bottle containing a repair fluid and provided with a lid with adapter with laterally projecting collar, where the socket is adapted for receiving the collar by sideways insertion of the lid into the socket.

The known pump units for vehicles are typically designed as flat boxes with rectangular shape and containing an air pump or compressor as well as valves etc. On the box is made a cutout or similar that forms a socket for receiving the collar provided on the neck of the bottle with repair fluid. The collar has to pipe stubs protruding in different directions laterally of the neck, and thereby projecting away from the pump unit. These stubs may be coupled to ends of hoses that are fastened in the pump unit and which may conduct compressed air to the bottle and compressed air mixed with repair fluid away from the bottle, respectively. The pump is used both for pumping tyres on vehicles that have lost pressure and for repairing punctured tyres with the repair fluid in the bottle.

By displacing the bottle and thereby the collar into the cutout or socket provided in the pump unit, the bottle is held temporarily during use, possibly permanently in case of permanent installation of the pump unit in the vehicle. A drawback of the known pump units of this kind with such sockets is that the bottle is not secured very well and is in danger of being jerked loose by jolts and vibrations during driving of the vehicle.

SUMMARY OF THE INVENTION

This problem is solved by the peculiar feature that the socket includes two resilient arms arranged to grip around the collar, as the arms are adapted to be displaced away from each other at the insertion of the bottle into the socket, and that the arms are adapted to engage the collar with snap action when the bottle is in its final position.

Due to the snap action, the arms may now hold the bottle in position as long as desired. Furthermore, the bottle may easily be removed from the socket by just twisting it out of engagement of the arms. The arms may be designed in several ways, e.g. with shape like leaf springs that are fastened at both ends in the pump unit, and which curve towards each other between the ends. The arms may furthermore extend in parallel with the collar in its direction of insertion, or they may extend perpendicularly to the collar.

However, it is preferred that the arms are secured in the socket by their first ends and are extending towards their second, free ends that point largely opposite to the direction of insertion of the bottle into the socket.

When the collar of the bottle does not have a round shape, but has two projections or edges that face opposite or laterally relative to the direction of insertion, it is preferred that the arms at each free end are provided with notches that are shaped and disposed so as to engage corresponding projections on the collar.

In order to achieve a cheap and simple design it is furthermore preferred that the arms extend substantially along one side surface of the pump unit, and that the arms are moulded in one piece with the socket.

THE DRAWING

A preferred embodiment of the invention is described in more detail below with reference to the drawing, wherein.

DESCRIPTION OF EXAMPLES OF EMBODIMENTS

Figure 1:
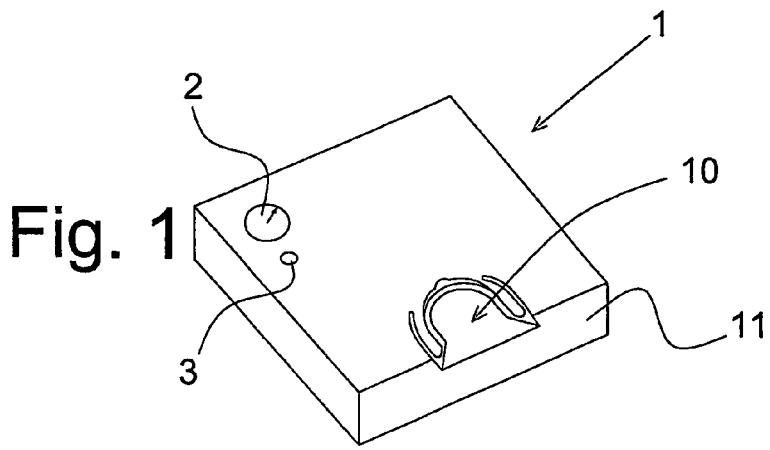
FIG. 1 shows a pump unit according to the invention in perspective view.
Figure 2:
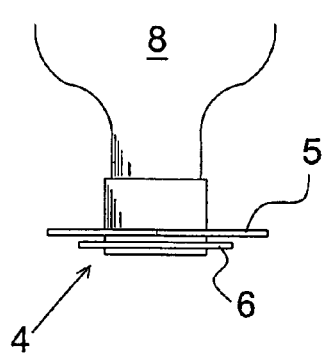
FIG. 2-4 shows the top of a bottle with repair fluid with an adapter/lid provided with a collar as seen from the side of insertion, from the left on FIG. 2 and from below, respectively.
Figure 3:
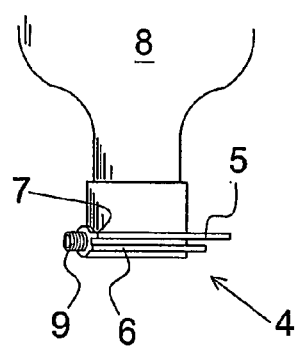
Figure 4:
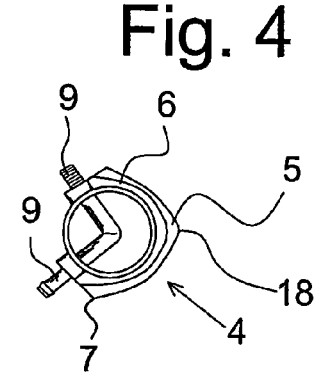

A pump unit according to the invention, e.g. for accessory for cars, as shown on FIG. 1 is shaped largely as a flat box 1 with a dial indicator 2 and operating button 3. Except for the inventive features described below, the arrangement and function of the unit are known per se.

A bottle 8 with repair fluid is provided with a special lid with adapter 4 having a large collar 5 and a small collar 6 which is disposed in parallel with the large collar 5. The adapter 4 is known per se and has previously been used in prior art pump units that have a socket for the adapter 4 only consisting of a cutout in the side edge of the unit, where the collars 5 and 6 were able to get in and 'grip' around the plate material that constitutes the outer box-like jacket on the unit. However, the bottle is not secured and may fall out, e.g. by jolting occurring during driving.

As the large collar 5 has two opposite and almost lateral projections 7, the latter are utilised for holding the adapter 4 and thereby the bottle with repair fluid 8. In the adapter 4 is provided two stubs 9 for supply and discharge of air and repair fluid.

Figure 5:
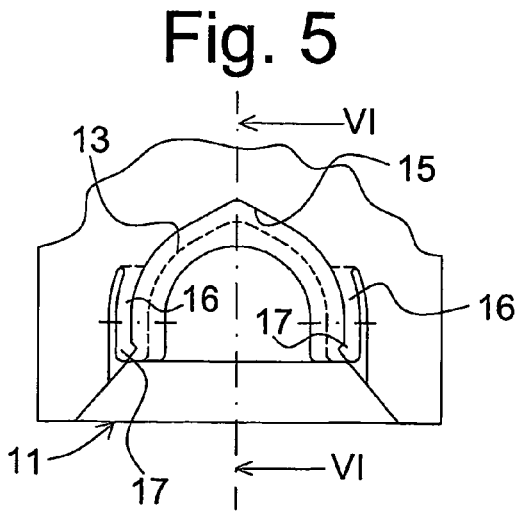
FIG. 5 shows an enlarged detail of the socket of the pump unit as seen from above.
Figure 6:
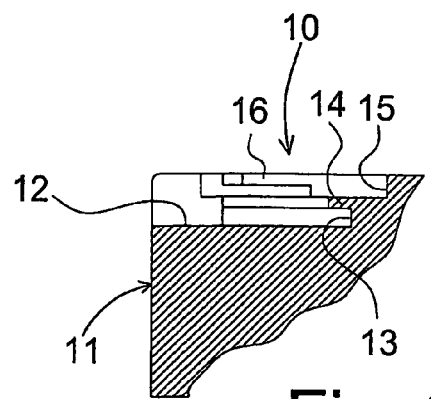
FIG. 6 shows a section along the line VI-VI of FIG. 5.

Holding the adapter 4 with bottle 8 in correct position of use is achieved by shaping the socket 10 as shown on FIGS. 5 and 6. In normal position of use of the pump unit, a largely plane, horizontal bottom 12 extends from a vertical side edge 11 on the unit 1 to a lower, vertical rear wall 13 which, as shown on FIG. 5, has a curved shape. The rear wall 13 is limited upwards by a plane and almost semi-circular collar 14 that extends towards the centre of the socket 10. The top side of the collar 14 extends flatly towards an upper rear wall 15 that has the same or approximately the same shape as the large collar 5, i.e. pointed shape. Along opposite sides at the rear wall 15, two resilient arms 16 are formed, both extending against the side edge 11. At their extreme, free ends, the arms 16 have projections 17 facing each other and disposed so that they may engage the collar 5 behind the projections 7.

During use, the adapter 4 with mounted bottle 8 is pushed laterally with the pointed end 18 of the large collar 5 into the socket 10. Thereby, the arms 16 are pushed away from each other until the projections 17 engage behind the projections 7 on the collar 5. Simultaneously, the small collar 6 goes in under the collar 14 of the socket, so that the bottle 8 cannot tilt out of engagement with the arms 16 and the socket 10. In that way, a secure snap action is established for holding the bottle 8 in position, while at the same time facilitating removal the bottle 8 again, as the projections 17 are inclining also at their sides facing the rear wall 15.

The invention claimed is:

1. Pump unit for vehicles designed with a side edge along which there is provided a socket for holding in position a bottle containing a repair fluid and provided with a lid with laterally projecting collar, where the socket is adapted for receiving the collar by sideways insertion of the lid into the socket, characterized in that the socket includes two resilient arms arranged to grin around the collar, as the arms are adapted to be displaced away from each other at the insertion of the bottle into the socket, and that the arms are adapted to engage the collar with snap action when the bottle is in its final position, wherein the arms at each free end are provided with notches that are shaped and disposed so as to engage corresponding projections on the collar.

2. Pump unit according to claim 1, wherein the arms are secured in the socket by their first ends and are extending towards their second, free ends that point largely opposite to the direction of insertion of the bottle into the socket.

3. Pump unit according to claim 1, wherein the arms extend substantially along one side surface of the pump unit and that the arms are moulded in one piece with the socket.

* * * * *